(12) United States Patent
Cheng et al.

(10) Patent No.: US 7,502,222 B2
(45) Date of Patent: Mar. 10, 2009

(54) TABLET PC AND METHOD FOR SUSTAINING THE SAME

(75) Inventors: Ping Yu Cheng, Taipei (TW); Chien-Chu Lu, Taipei (TW); Cheung-Shien Tu, Taipei (TW)

(73) Assignee: Arima Computer Corporation, Taipei (TW)

( * ) Notice: Subject to any disclaimer, the term of this patent is extended or adjusted under 35 U.S.C. 154(b) by 290 days.

(21) Appl. No.: 11/533,520

(22) Filed: Sep. 20, 2006

(65) Prior Publication Data

US 2008/0068786 A1    Mar. 20, 2008

(51) Int. Cl.
*G06F 1/16* (2006.01)

(52) U.S. Cl. ....................................... 361/683

(58) Field of Classification Search .................. 361/683
See application file for complete search history.

(56) References Cited

U.S. PATENT DOCUMENTS

| | | | | |
|---|---|---|---|---|
| 5,100,098 A * | 3/1992 | Hawkins | ...................... | 361/683 |
| 5,175,672 A * | 12/1992 | Conner et al. | ............... | 361/680 |
| 5,293,300 A * | 3/1994 | Leung | .......................... | 361/683 |
| 6,483,445 B1 * | 11/2002 | England | ...................... | 361/681 |
| 6,870,732 B2 * | 3/2005 | Huang et al. | ................ | 361/683 |
| 7,025,274 B2 * | 4/2006 | Solomon et al. | ............. | 361/681 |
| 7,042,711 B2 * | 5/2006 | Tanaka et al. | ............... | 361/679 |
| 7,167,358 B2 * | 1/2007 | Iwasaki et al. | .............. | 361/683 |
| 2005/0057896 A1 * | 3/2005 | Homer | ....................... | 361/686 |

* cited by examiner

*Primary Examiner*—Lisa Lea-Edmonds
(74) *Attorney, Agent, or Firm*—Volpe and Koenig PC

(57) ABSTRACT

A tablet PC and a assembling method thereof are provided. The tablet PC includes a body having a mounting point, a rotating mechanism mounted on the mounting point, and a power device mounted on the rotating mechanism. The power device is rotatable from a first position to a second position around the rotating mechanism so as to sustain the body.

17 Claims, 6 Drawing Sheets

TABLET PC AND METHOD FOR SUSTAINING THE SAME

FIELD OF THE INVENTION

The present invention relates to a tablet PC and its sustaining method used thereby. In particular, it refers to a tablet PC that exploits its battery device to sustain the computer core body.

BACKGROUND OF THE INVENTION

All average tablet PCs have handwriting tablets, allowing users to enter information. However, average tablet PCs are designed to lie prone on the desk surface. This design does not take into account that wrists would become sore easily after using the tablet PC for a long period of time. This problem evidently shows that this design of tablet PC lacks ergonomic consideration. Although conventional tablet PCs also have convertible keyboard, its full extension still requires an expansion of work space. These types of tablet PCs are far from being ideal.

Therefore, it is a high priority to improve the previously not considered ergonomic problem of the conventional tablet PC arising during information entry. After much experimentation, testing and research, the inventor has developed a new design for a tablet PC and its sustaining method used thereby. In addition to solving the drawbacks of the prior arts, this tablet PC also has the advantage of a more compact keyboard. This invention proposes to solve the problems arising from the prone placement of tablet PC unsuitable for entering information for a long period of time, and the cumbersome design of the convertible keyboard. Furthermore, it proposes to provide a solution for returning the computer to its original shape after being used at a slanted angle.

SUMMARY OF THE INVENTION

In accordance with an aspect of the present invention, a tablet PC is provided. The tablet PC includes a body having a mounting point, a rotating mechanism mounted on the mounting point, and a power device mounted on the rotating mechanism and rotatable from a first position to a second position around the rotating mechanism so as to sustain the body.

Preferably, the body has a first concavity, and the power device has a protrusion mounted in the first concavity.

Preferably, the rotating mechanism is mounted within the protrusion, and the power device being at the second position serves as a stand for the body.

Preferably, the body has a sliding concavity, a keyboard and a display device mounted in the sliding concavity, and the keyboard becomes available while the display device is moved from a handwriting position to an opened position along the sliding concavity.

Preferably, the power device has a concave surface containing the display device, and the keyboard is a touchpad keyboard.

In accordance with another respect of the present application, a tablet PC is provided. The tablet PC includes a body, a power device, and a rotating mechanism mounted between the body and the power device. The power device is rotatable from a first position to a second position around the rotating mechanism so as to sustain the body.

Preferably, the body has a front mounting portion connected with the power device.

Preferably, the body has a first concavity, and the power device has a protrusion mounted in the first concavity.

Preferably, the rotating mechanism is mounted within the protrusion, and the power device at the second position serves as a stand for the body.

Preferably, the body further has a sliding concavity, a keyboard and a display device mounted in the sliding concavity, and the keyboard appears while the display device is moved from a handwriting position to an opened position along the sliding concavity.

Preferably, the power device has a concave surface containing the display device, and the keyboard is a touchpad keyboard.

Preferably, the touchpad keyboard has plural keys responsive to a user's touch.

In accordance with another respect of the present application, a method for assembling a tablet PC having a body and a power device is provided. The method includes steps of a) mounting a rotating device between the body and the power device, and b) rotating the power device from a first position to a second position around the rotating device so as to sustain the body.

Preferably, the body comprises a sliding concavity, the tablet PC further comprises a display device and a keyboard, and the method further comprises a step of moving the display device from a handwriting position to an opened position along the sliding concavity so as to expose the keyboard.

In accordance with another aspect of the present application, a tablet PC is provided. The tablet PC includes a body having a sliding mechanism and a keyboard, a connecting device, a power device connected to the body via the connecting device, and a display device optionally movable from a handwriting position to an opened position along the sliding mechanism to expose the keyboard.

Preferably, the power device has a concave surface containing the display device, and the keyboard is a touchpad keyboard.

Preferably, the touchpad keyboard has plural keys responsive to a user's touch.

Preferably, the tablet PC further includes a rotating mechanism mounted between the body and the power device, and the power device rotates from a first position to a second position around the rotating mechanism so as to sustain the body.

Preferably, the body has a concavity, and the power device has a protrusion mounted in the concavity.

Preferably, the rotating mechanism is mounted within the protrusion, and the power device being at the second position serves as a stand for the body.

The above contents and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
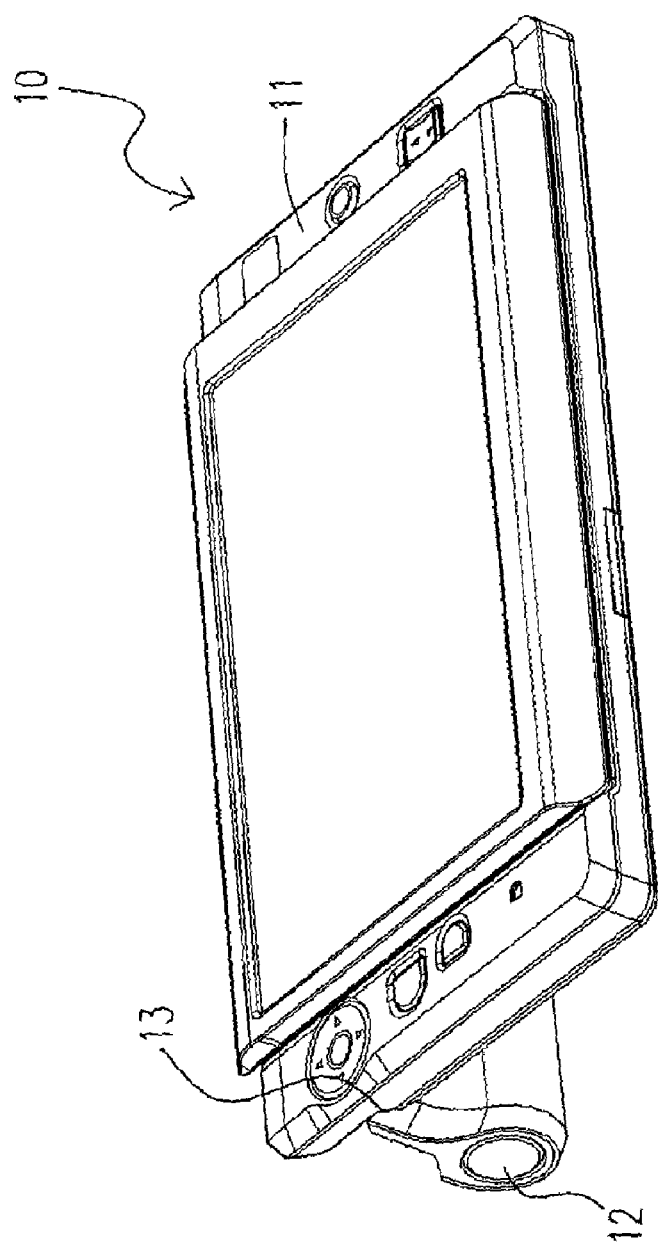
FIG. 1 is a 3D schematic view of a tablet PC in the first operation mode according to a preferred embodiment of the present invention.
Figure 2:
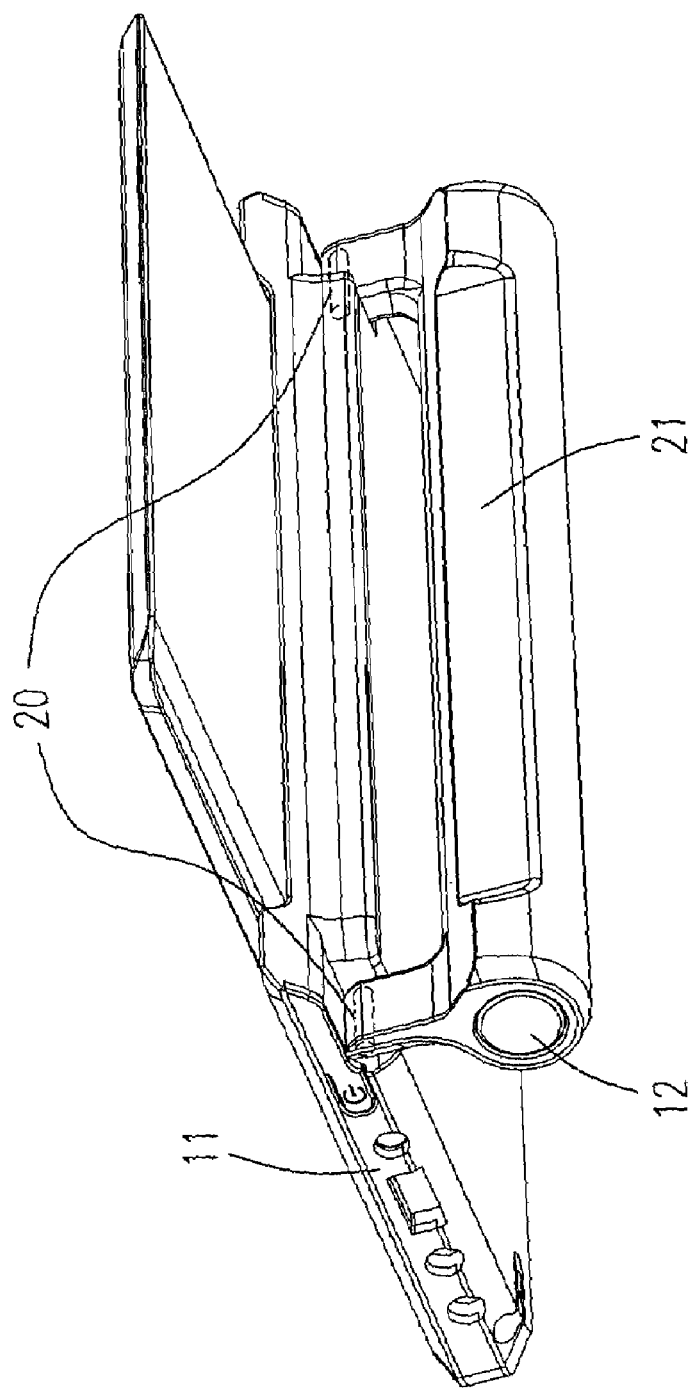
FIG. 2 shows the locations of the rotating devices of a tablet PC according to a preferred embodiment of the present invention.
Figure 3:
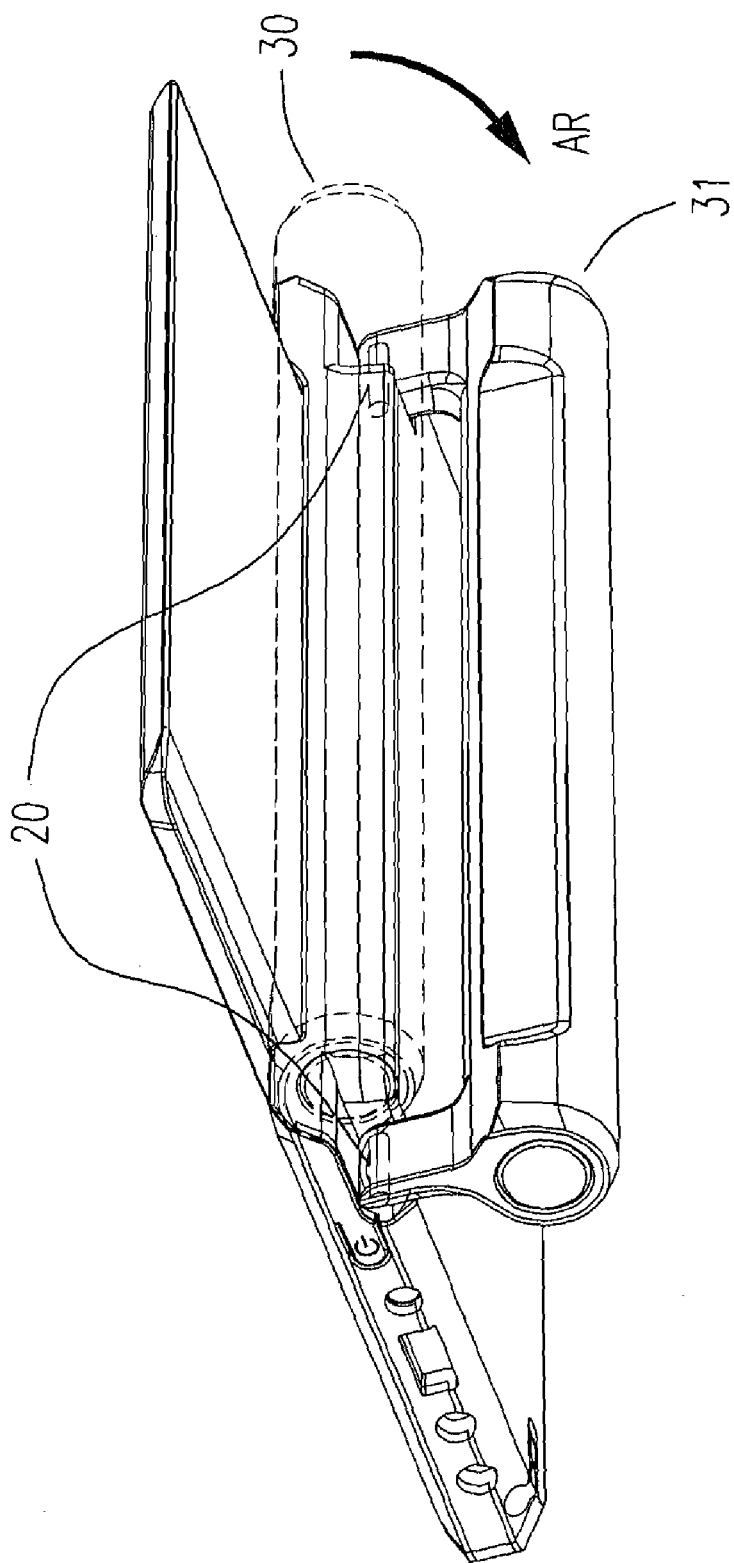
FIG. 3 illustrates the way that the battery device of the preferred embodiment of the present invention moves.

Please refer to FIG. 1 to FIG. 3 showing a preferred embodiment of a tablet PC 10. The tablet PC 10 includes a computer core body 11, a battery device 12, two front installation points 13 as shown in FIG. 1, and two rotating mechanisms 20 as shown in FIG. 2. In usual, each rotating mechanism 20 is made of an axle and a bearing. The two rotating mechanisms 20 are installed at the respective front installation points 13, one on each side of the computer core body 11, and they serve as links via which the battery device 12 is mounted onto the computer core body 11. As shown in FIG. 3, the arrow (AR) indicates that rotating around the rotating mechanism 20 brings the battery device 12 from a combination position 30 to a sustaining position 31. Thus, the battery device 12 serves as a stand to elevate and tilt the computer core body 11. With this stand, users would be able to use a handwriting pen (not shown) to enter information for a long period of time on tablet PC 10. In addition, the locations of front installation points might be varied according to the various demands.

Figure 4:
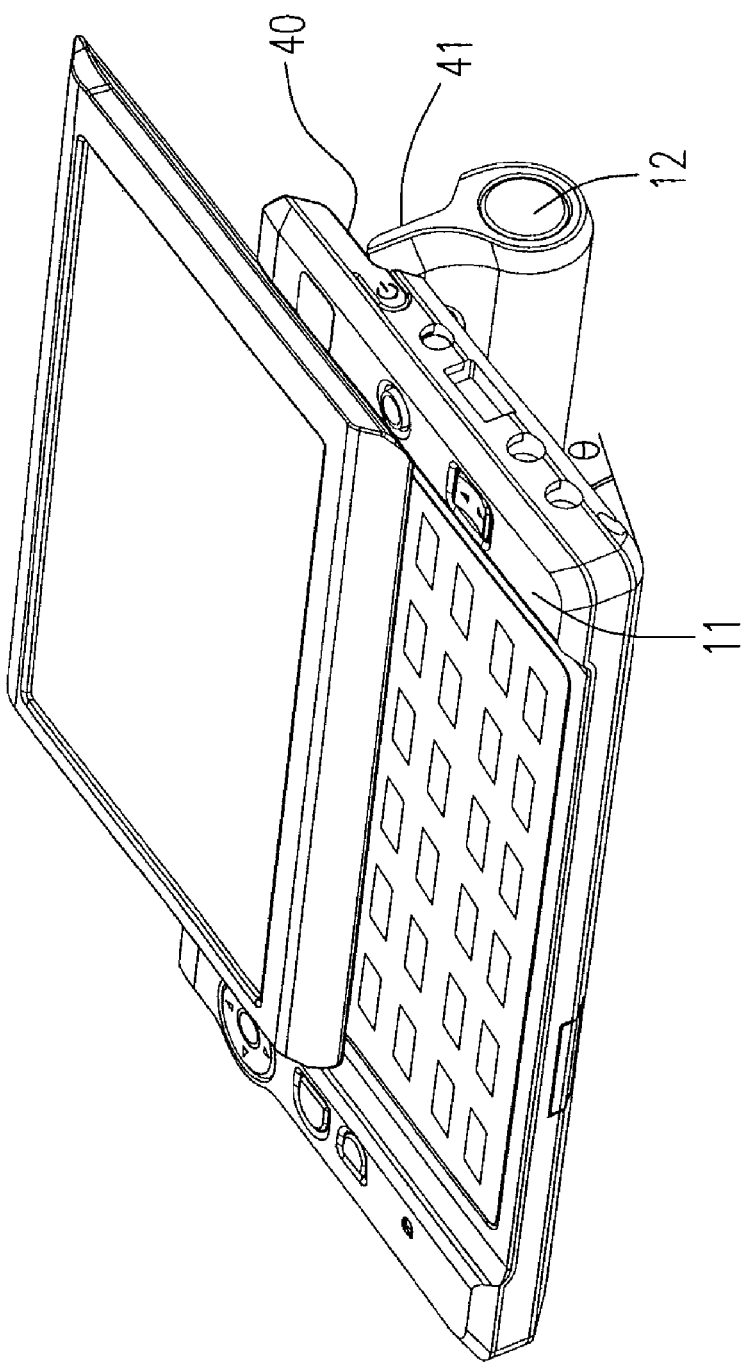
FIG. 4 is a 3D schematic view of the concave end of the computer core body and the protruding end of the battery device according to the preferred embodiment of the present invention.

Please refer to FIG. 4, which shows a preferred embodiment of a tablet PC 10. As shown in FIG. 4, the computer core body 11 has a concave end 40 for accommodating the protruding ends 41 of battery device 12. Inside each protruding end 41 is where each rotating mechanism 20 is located. At the support position 31 the battery device 12 also serves as a stand as shown in FIG. 4 which elevates and tilts the tablet PC 10 to have θ degrees, making the use of the tablet PC more ergonomic.

Figure 5:
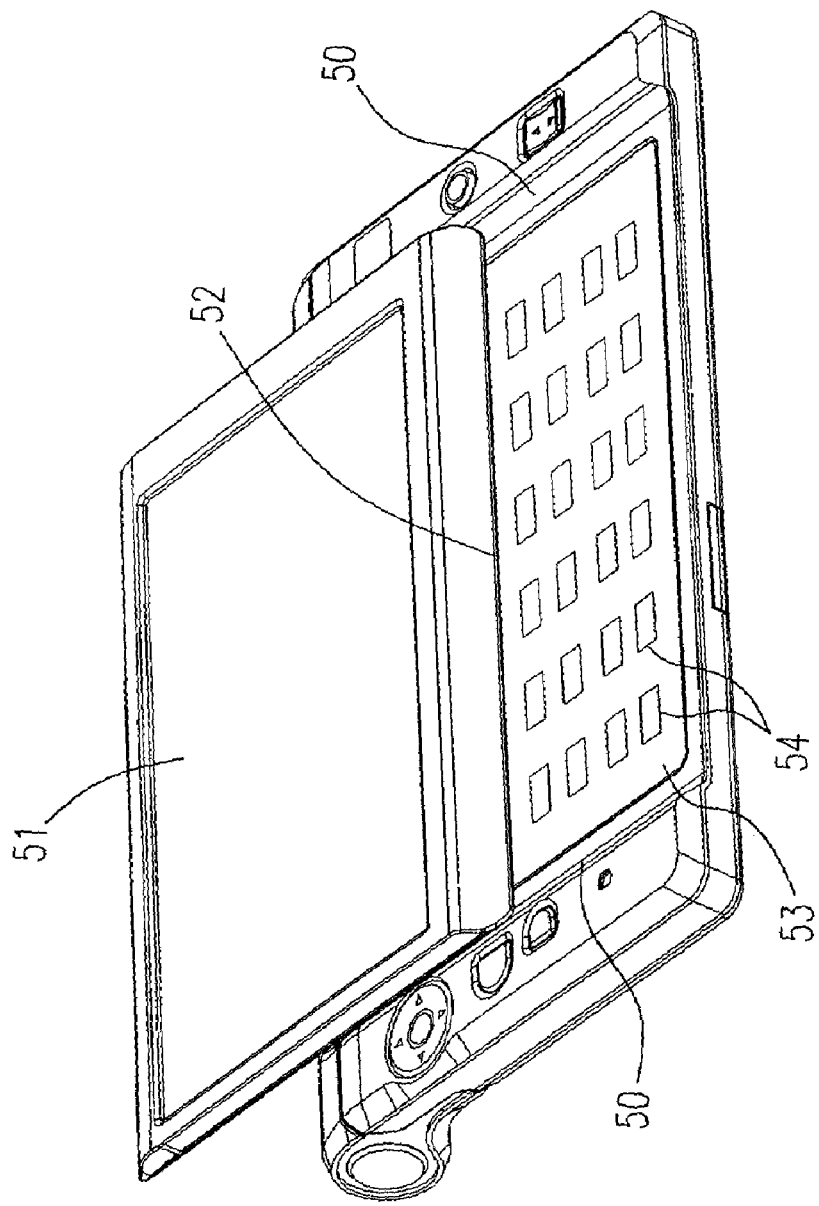
FIG. 5 is a 3D schematic view of the display device after sliding along the sliding concavities to reveal the keyboard according to a preferred embodiment of the present invention.
Figure 6:
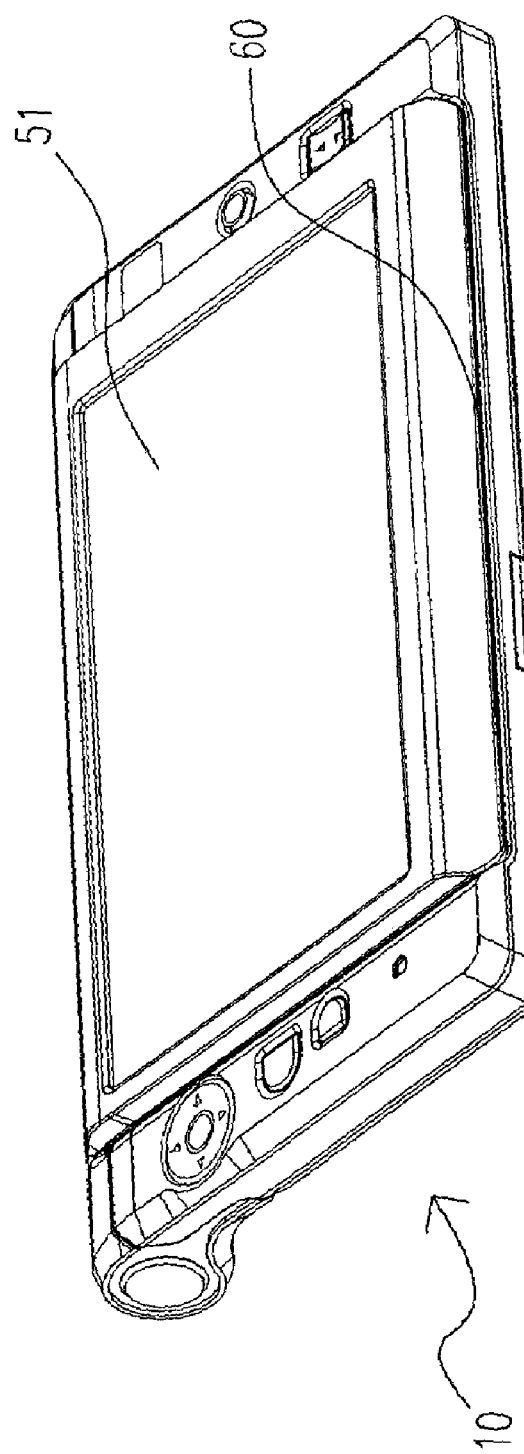
FIG. 6 is a 3D schematic view of a tablet PC in the second operation mode according to a preferred embodiment of the present invention.

Please refer to FIG. 5. The tablet PC 10 further includes two sliding concavities 50 located on computer core body 11. The sliding concavities 50 provide tracks for sliding the display device 51 from a handwriting position 60 to an opened position 52. In addition, this movement of display device 51 reveals a keyboard 53 (non-convertible). Referring back to FIG. 2, a concave surface 21 on battery device 12 allows such sliding movement of display device 51 beyond the edge of computer core boy 11. Also shown in FIG. 5 is the touchpad keyboard 53 that contains multiple raised keys 54 to assist the users' orientations. The tablet PC 10 shown in FIG. 6 is intended for mobile use without a supporting table surface.

From a technical point of view, the present invention is a tablet PC 10 that includes a computer core body 11, a battery device 12, which is placed in computer core body 11, and rotating mechanisms 20, which are installed at front installations points 13 in between the computer core body 11 and the battery device 12. By rotating around the rotating mechanisms 20, the battery device 12 moves from a combination position 30 to a sustaining position 31, serving as a stand for elevating and tilting the computer core body 11. Certainly, at present, the battery device 12 is mounted on the front installation point 13 of the computer core body 11. In addition, it should be noted that the mounting locations of the installation points could be varied based on the different demands.

From another practical point of view, the present invention relates to a sustaining method for a tablet PC 10 that is applied to the computer core body 11. At the front installation point 13 of computer core body 11, a battery device 12 is installed. The sustaining method includes placing rotating mechanism at the front installation points in between the computer core body 11 and the battery device 12. Rotation around rotating mechanisms 20 brings the battery device 12 from a combination position 30 to a sustaining position 31. Thus, the battery device 12 is utilized within the sustaining method for a tablet PC 10, acting as a stand to elevate and tilt the computer core body 11. Certainly, this sustaining method further relates to the two sliding concavities 50 located on computer core body 11. Sliding display device 51 along the sliding concavities 50 moves the display device 51 from the handwriting position 60 to an opened position 52. As a result of such sliding movement, a keyboard 53 becomes available.

Viewing from another operational angle, the present invention relates to a tablet PC 10, which includes a computer core body 11, a battery device 12 installed at the front installation points 13 of computer core body 11, and two sliding concavities 50 located on computer core body 11. During the operation, the display device 51 could be moved from a handwriting position 60 to an opened position 52 via the sliding concavities 50, and then the keyboard 53 would be as a result. Certainly, the computer also includes rotating mechanisms 20 installed at front installation points 13 in between computer core body 11 and battery device 12. During operation, the battery device 12 could also be used as a stand to elevate and tilt the computer core body 11 when it is rotated around the rotating mechanisms 20 from the combination position 30 to the sustaining position 31.

In view of the aforesaid discussions, the present invention is a novel design that utilizes a rotating mechanism installed at an installation point where the computer core body and battery device are linked to provide a method for using the battery device to elevate and tilt the computer core body. In addition, sliding concavities are installed on this computer core body. Sliding the display device along these sliding concavities from a handwriting position to an opened position would reveal the keyboard lying under the display device.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A tablet PC, comprising:

a body having a mounting point and a first concavity;

a rotating mechanism mounted on the mounting point; and a power device having a protrusion mounted in the first concavity, mounted on the rotating mechanism, and rotatable from a first position to a second position around the rotating mechanism so as to sustain the body.

2. A tablet PC as claimed in claim 1, wherein the rotating mechanism is mounted within the protrusion, and the power device being at the second position serves as a stand for the body.

3. A tablet PC as claimed in claim 1, wherein the body has a sliding concavity, a keyboard and a display device mounted in the sliding concavity, and the keyboard becomes available while the display device is moved from a handwriting position to an opened position along the sliding concavity.

4. A tablet PC as claimed in claim 3, wherein the power device has a concave surface containing the display device, and the keyboard is a touchpad keyboard.

5. A tablet PC, comprising:
a body having a first concavity;
a power device having a protrusion mounted in the first concavity; and
a rotating mechanism mounted between the body and the power device, wherein the power device is rotatable from a first position to a second position around the rotating mechanism so as to sustain the body.

6. A tablet PC as claimed in claim 5, wherein the body has a front mounting portion connected with the power device.

7. A tablet PC as claimed in claim 6, wherein the rotating mechanism is mounted within the protrusion, and the power device at the second position serves as a stand for the body.

8. A tablet PC as claimed in claim 5, wherein the body further has a sliding concavity, a keyboard and a display device mounted in the sliding concavity, and the keyboard appears while the display device is moved from a handwriting position to an opened position along the sliding concavity.

9. A tablet PC as claimed in claim 8, wherein the power device has a concave surface containing the display device, and the keyboard is a touchpad keyboard.

10. A tablet PC as claimed in claim 9, wherein the touchpad keyboard has plural keys responsive to a user's touch.

11. A method for assembling a tablet PC having a body with a first concavity and a power device with a protrusion, comprising steps of:

a) mounting the protrusion of the power device in the first concavity of the body;
b) mounting a rotating device between the body and the power device; and
c) rotating the power device from a first position to a second position around the rotating device so as to sustain the body.

12. A method as claimed in claim 11, wherein the body comprises a sliding concavity, the tablet PC further comprises a display device and a keyboard, and the method further comprises a step of moving the display device from a handwriting position to an opened position along the sliding concavity so as to expose the keyboard.

13. A tablet PC, comprising:
a body having a sliding mechanism, a cavity and a keyboard;
a connecting device;
a power device having a protrusion and connected to the body via the connecting device; and
a display device optionally movable from a handwriting position to an opened position along the sliding mechanism to expose the keyboard.

14. A tablet PC as claimed in claim 13, wherein the power device has a concave surface containing the display device, and the keyboard is a touchpad keyboard.

15. A tablet PC as claimed in claim 14, wherein the touchpad keyboard has plural keys responsive to a user's touch.

16. A tablet PC as claimed in claim 13, further comprising a rotating mechanism mounted between the body and the power device, wherein the power device rotates from a first position to a second position around the rotating mechanism so as to sustain the body.

17. A tablet PC as claimed in claim 16 wherein the rotating mechanism is mounted within the protrusion, and the power device being at the second position serves as a stand for the body.

* * * * *